Patented Sept. 23, 1947

2,427,677

UNITED STATES PATENT OFFICE 2,427,677

HALOGENATED QUINOLINE INSECTICIDES

William A. Knapp, New York, N. Y., assignor to General Chemical Company, New York, N. Y., a corporation of New York No Drawing. Application January 24, 1942, Serial No. 428,084

7 Claims. (Cl. 167—33)

This invention relates to insecticides, and particularly to a new class of insecticides of the type known as contact insecticides and employed for combatting aphids and similar piercing-sucking insects, which require or are amenable to control by contact insecticides.

The insecticides of the present invention have been found to possess toxicity against aphids such as cabbage aphids and chrysanthemum aphids.

The insecticides of the present invention are halogenated quinolines.

Examples of this class of compounds are the chloro and bromo substitution products of quinoline, quinaldine and lepidine.

The contact insecticides of the present invention may be applied in the manner customary for the application of prior contact insecticides, as by spraying the insecticide alone or in admixture with solid or liquid diluents upon the insects.

The insecticidal compounds of the present invention are compatible with and therefore may be used in combination with fungicides, other insecticides, for example stomach insecticides and supplementary materials such as diluents and wetting agents commonly used in combination with insecticides.

The following tabulation of results obtained with typical compounds within the purview of the invention is indicative of the efficiency of the new contact insecticides.

Test 1 below was conducted by spraying leaves from infested plants with an aqueous emulsion prepared from benzene, tri-ethanolamine, oleic acid, and water in the following concentrations:

| | | |
|---|---|---|
| Water | cc | 800 |
| Benzene | cc | 1.5 |
| Triethanolamine | cc | 1.0 |
| Oleic acid | cc | 0.5 |
| 2-chloroquinoline | gm | 1 |

The triethanolamine and oleic acid, which react to form triethanolamine oleate, were used as a wetting agent to improve dispersion of the insecticide in the aqueous diluent. Leaves infested with gree cabbage aphids were sprayed on a turntable so that the under side of each leaf received 10 cc. of spray and the upper side 5 cc.

A simultaneous check was employed using the same emulsion omitting the toxicant. After the leaves were sprayed they were fitted with vials of water and placed in halves of petri dishes which were in turn placed in pans of salt solution. The aphids surviving at the end of 24 hours were counted and the percentage control determined by the formula $100(X-Y)/X$ where X represents the percentage suviving on the check leaves and Y represents the percentage surviving on the toxicant-treated leaves.

In Test 2 the following solution was employed as in Test 1 but with the substitution of brown chrysanthemum aphids for cabbage aphids:

| | | |
|---|---|---|
| Water | cc | 800 |
| Benzene | cc | 1.5 |
| Oleic acid | cc | 0.5 |
| Triethanolamine | cc | 0.25 |
| 2-chlorolepidine | gm | 1 |

Tests 3, 4, 5, 6, and 7 were conducted in a manner similar to Tests 1 and 2 except that a wetting agent at a concentration of 1:10,000 substituted for the triethanolamine oleate. In these tests the test insects were green chrysanthemum aphids.

Test 8 was a nicotine sulfate check conducted simultaneously with Tests 4 and 7.

Test 9 was a nicotine sulfate check conducted simultaneously with Tests 3 and 6.

| Test No. | Compound | Concentration | No. of insects | Per cent Control |
|---|---|---|---|---|
| 1 | 2-chloroquinoline | 1–800 | 220 | about 90. |
| 2 | 2-chlorolepidine | 1–800 | 351 | about 85. |
| 3 | 4-chloroquinaldine | 1–400 | 549 | about 99. |
| 4 | 4-bromoquinaldine | 1–400 | 861 | Do. |
| 5 | 2-chloroquinoline | 1–800 | 456 | about 93. |
| 6 | 2-chlorolepidine | 1–400 | 588 | about 90. |
| 7 | 8-chloroquinoline | 1–400 | 441 | about 83. |
| 8 | nicotine sulfate | 1–400 | 628 | about 87. |
| 9 | do | 1–400 | 632 | about 73. |

I claim:

1. The method of combatting sucking insects which comprises distributing upon the insect a contact insecticide comprising a halogenated quinoline.

2. The method of combatting aphids, which comprises spraying the aphids with a contact insecticide comprising a halogenated quinoline.

3. The method of combatting aphids, which comprises spraying the aphids with a contact insecticide comprising 2-chloro-quinoline.

4. The method of combatting aphids, which comprises spraying the aphids with a contact insecticide comprising 4-chloroquinaldine.

5. The method of combatting aphids, which comprises spraying the aphids with a contact insecticide comprising 4-bromoquinaldine.

6. A contact insecticidal composition comprising an aqueous emulsion containing 4-chloroquinaldine.

7. The contact insecticidal composition comprising an aqueous emulsion containing 4-bromoquinaldine.

WILLIAM A. KNAPP.

REFERENCES CITED

The following references are of record in the file of this patent:

McAllister et al., Journal of Economic Ent., vol. 23, page 914.

Tatterfield et al., Annals of Applied Biology, vol. 14, pages 231–239.

Bushland, Jour. Econ. Ent., vol. 33, No. 4, pp. 669–670.

Chemical Abstracts, vol. 19, page 1279.